Feb. 14, 1961  E. G. LEWIS ET AL  2,971,372
ULTRASONIC TESTING APPARATUS
Filed Sept. 19, 1956  4 Sheets-Sheet 1

Inventors,
E. G. Lewis
D. A. G. Eldridge
G. Bradfield
H. C. M. Bertoya
By
W. E. Thibodeau & A. W. Pew
Attorneys.

Feb. 14, 1961     E. G. LEWIS ET AL     2,971,372
ULTRASONIC TESTING APPARATUS

Filed Sept. 19, 1956     4 Sheets-Sheet 4

Inventors,
E. G. Lewis
D. A. G. Eldridge
G. Bradfield
H. C. M. Bertoya
By
W. E. Thibodeau & A. W. Dew
Attorneys United States Patent Office 2,971,372
Patented Feb. 14, 1961

2,971,372

ULTRASONIC TESTING APPARATUS

Ewart Gordon Lewis, Westmoreland Hills, Md., and Dennis Arthur George Eldridge, Waltham Abbey, Geoffrey Bradfield, Surbiton, and Hastings Charles Maxim Bertoya, Romford, England, assignors to Minister of Supply, in Her Majesty's Government of the United Kingdom of Great Britain and Northern Ireland, London, England Filed Sept. 19, 1956, Ser. No. 610,837

5 Claims. (Cl. 73—67.5)

The present invention relates to ultrasonic testing apparatus for detecting flaws and faults in articles by ultrasonic waves. Apparatus of this type employ a transmitting device which is arranged to pass a beam of ultrasonic waves through a portion of the article to be inspected and a receiving device which measures the strength of the waves that have passed through the article. A flaw in the form of some kind of inhomogeneity or discontinuity in the interior of the article encountered by the beam will reduce the strength of the received waves. However in transmitting the ultrasonic waves, standing waves and reflections caused by the various interfaces and reflecting surfaces present tend to obscure the reduction of received signal strength due to the flaw and produce spurious fluctuations in signal strength which may be falsely interpreted.

An object of the present invention is to provide an ultrasonic testing apparatus in which an indication of the diminution due to a flaw of the strength of the signal transmitted through an inspected portion of an article can be obtained which is substantially unaffected by standing waves and stray reflections.

According to the invention, an ultrasonic testing apparatus for detecting flaws in solid articles comprises a transmitting device for projecting a beam of pulses of ultrasonic waves through a portion of an article, and a receiving device for receiving the pulses that have passed through the article and for indicating the strength of the leading half waves of the received pulses. The intervals between successive pulses is arranged to be sufficiently long to ensure that all disturbances due to a pulse die away to an insignificant value before the occurrence of the next pulse.

Each pulse normally consists of many waves but only the first half wave is substantially unaffected by interface reflections and consequently when a flaw is encountered only the first half wave undergoes a diminution in amplitude due almost solely to its own adsorption and reflection by the flaw. This is because the first received half wave has travelled by the most direct route from transmitter to receiver and cannot, therefore, have an additional amplitude variation to any material extent as the reflected signals must travel over longer paths.

For materials whose adsorption of ultrasonic waves is low, multiple reflections can effectively increase the duration of the transmitted pulses and when inspecting articles made of these materials, the repetition rate of the transmitted pulses should be lower than that used for articles made of more absorbent material.

In order that the invention may be more clearly understood and various features thereof described, an ultrasonic testing apparatus will now be described with reference to the accompanying drawings in which.

Figure 4:
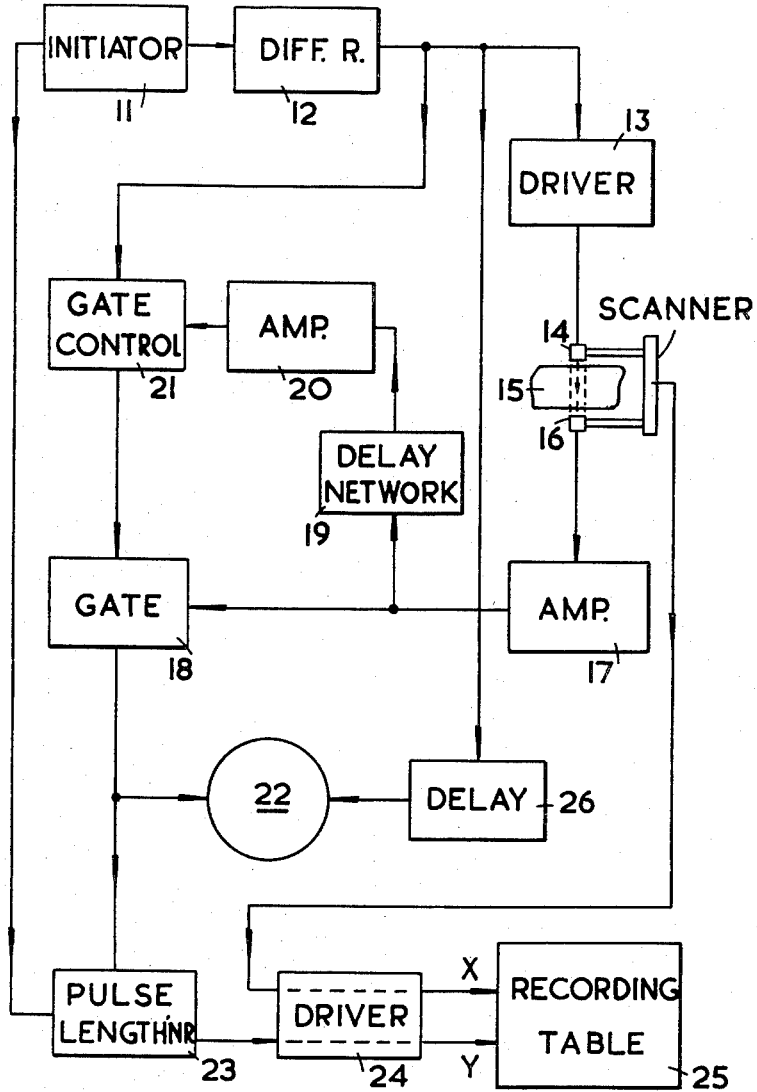
Figure 5:
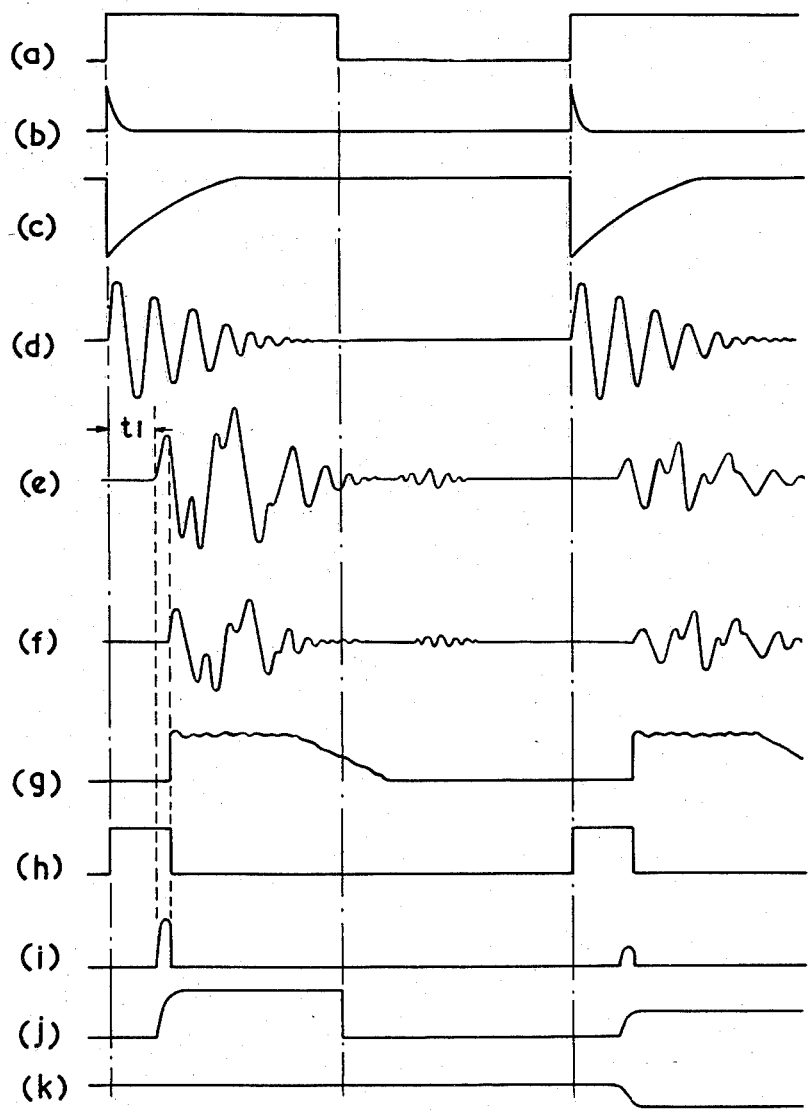
Figure 6:
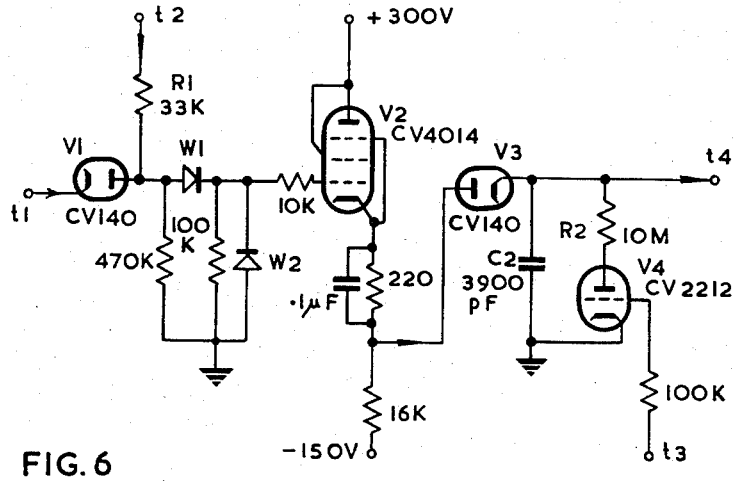
Figure 7:
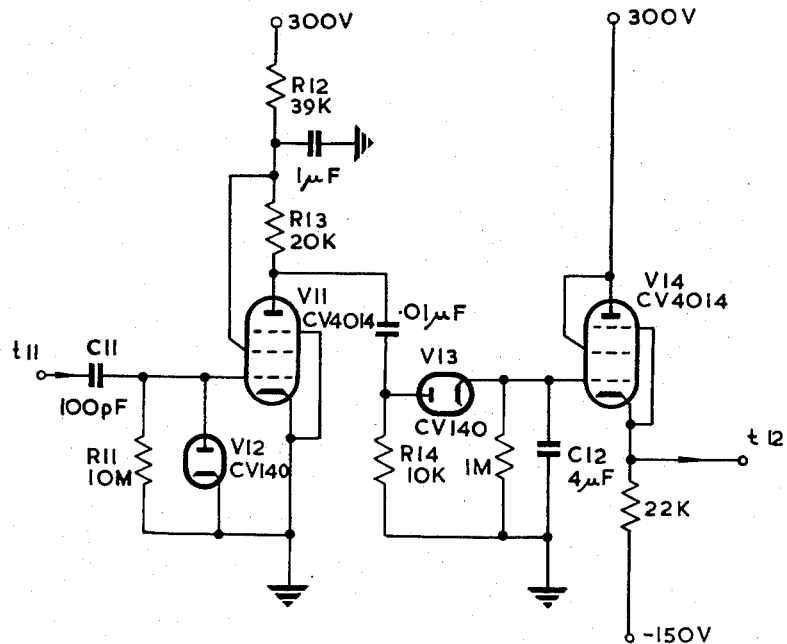

Figures 3(a) to 3(e) are output readings of the ultrasonic receiver apparatus which show the effect of a flaw in the cylinder;

Figure 4 is a schematic diagram of the electrical circuits of the ultrasonic apparatus;

Figures 5(a) to 5(k) show waveforms of voltages occurring at various parts of the circuits shown in Figure 4; while Figures 6 and 7 show parts of the electrical circuits in detail.

The complete testing apparatus to be described consists essentially of an electrical generator of electrical pulse signals, a transmitting device having an electro-mechanical transducer which when driven by the pulse signals is arranged to project a beam of pulses of ultrasonic waves through the article being examined, a receiving device having an electro-mechanical transducer which produces electrical signals in accordance with the received ultrasonic waves, electrical circuits for producing a continuous output signal proportional to the mean amplitude of the leading first half ultrasonic wave of the received pulses, and a graphical recording equipment for recording this continuous output signal. A scanning mechanism is also employed to move the transmitting and receiving devices and the article to be examined so that in the course of one complete operation an extensive survey of the article is carried out.

Articles of any shape can be examined by this ultrasonic technique provided that the transmitting and receiving devices can be positioned on opposite sides of various parts of the article and an indication obtained of the normal received signal strength with which the reduced strength due to a flaw can be measured. For many articles however the thickness of various parts is a constant for a considerable length along certain paths and then, if a scan is made along these paths and a continuous reading made of the received signal strength, a flaw will produce a noticeable dip in an otherwise substantially constant output signal level.

A simple scanning arrangement having scanning runs which will produce constant output signal levels in the absence of flaws can be provided for a cylindrically shaped article having a similar cross-section throughout its length. A series of longitudinal scans may be made by repeatedly moving a transmitting device inside the cylinder and a receiving device opposite it and outside the cylinder from one end of the cylinder to the other end, and by rotating the cylinder between scans.

Figure 1:
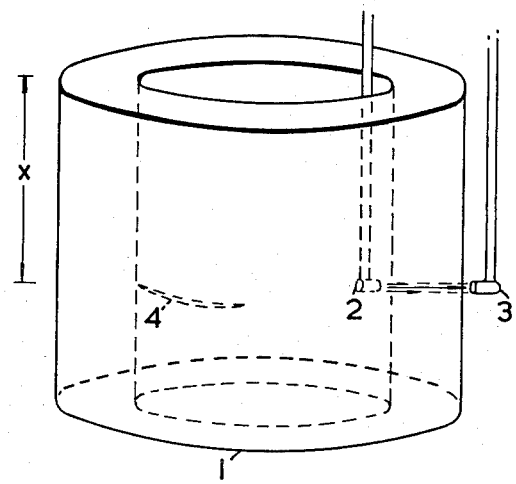
Figure 1 is a view of a cylinder being examined by the ultrasonic testing apparatus.

This simple arrangement is shown in Figure 1 in which a cylindrical article 1 is being examined by an ultrasonic testing apparatus of which only the transmitting device 2 and receiving device 3 are shown with supporting rods by which they are moved by the scanning mechanism and furnished with electrical connections to and from the electrical transmitting and receiving circuits. For simplicity a cylinder having an ordinary uniform cross-section is shown.

A radial section of the cylinder 1 between the transmitting device 2 and the receiving device 3 is scanned and by moving the supporting rods longitudinally along their length a scan along the cylinder from one end to the other is obtained having a constant output signal strength in the absence of flaws. A graphical recording mechanism fed continuously with the output signal will then record a level line having a dip when a flaw is scanned by the transmitting and receiving devices. It will be appreciated that this method of scanning can be used for an article having any cross-sectional shape which is the same throughout its length and although the wall thickness and therefore the output strength may vary from scan to scan, the normal output strength remains constant throughout each scan.

Figure 2:
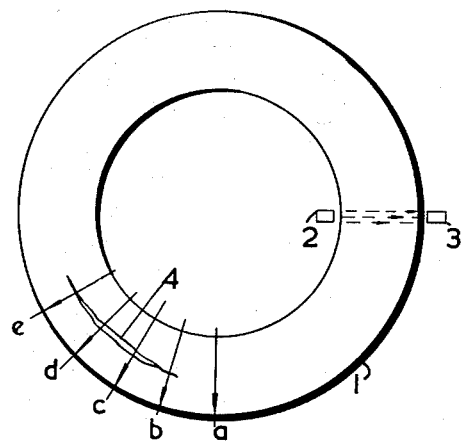
Figure 2 is a cross-sectional view of the arrangement shown in Figure 1 at a depth $x$ below the top of the cylinder.
Figure 3:
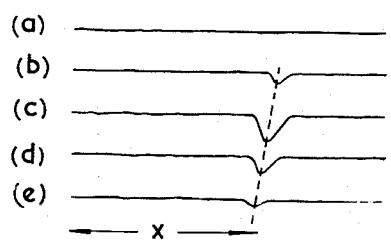

By arranging to rotate the cylinder in a given direction after each scan a series of scans may be carried out until readings have been obtained all round the cylinder. Figure 2 shows a cross-sectional view of the cylinder 1 at a distance $x$ below the top and shows a flaw 4 which extends for some distance around the cylinder. Five successive scans $a$ to $e$ which occur when the cylinder is rotated by 15 degrees between scans are shown which traverse the flaw 4. Figures 3(a) to 3(e) show the outputs produced by the scans $a$ to $e$ respectively recorded continuously on a recording table as the devices scan the length of the cylinder. A diminution of the normal output reading caused by a flaw will then appear as a dip below the normal recording level. Examination of the record shows that the flaw extends over an arc of more than 45 degrees around the cylinder at an average distance $x$ from the top of the cylinder. The record reveals that the flaw is larger in the central part of its length as the disturbances are greater in the plot shown in Figures 3(c) and 3(d). The record also shows that the end of the fault met by scan $e$ is slightly nearer the top of the cylinder than the end met by scan $b$ as the dip in scan $e$ occurs earlier than that in scan $b$.

For testing articles made of thermo-plastic materials which are relatively highly absorbent, the electro-mechanical transducers may be barium titanate crystals and the article to be tested and the transmitting and receiving devices completely immersed in a tank filled with de-aerated water, a suitable matching fluid for the transducers. The crystal is cut to have a natural frequency of oscillation generally within the range 100 kc./s. to 500 kc./s. and suitable for the material of which the tested article is composed.

An increase in the energy of the ultrasonic waves transmitted by the transmitting device may be obtained by filling the transducer housing with an oil such as transformer oil so that the air space between the crystal and the transmitting diaphragm is eliminated. Similar treatment of the receiving device similarly increases the output signal strength.

The ultrasonic testing apparatus will now be described in greater detail with reference to Figures 4 and 5. Figure 4 shows in schematic form the electrical circuit arrangements for driving the ultrasonic transmitting device and for producing a record of the signals received by the receiving device.

An initiator circuit 11, which is a free-running multi-vibrator operating at 100 cycles per second produces an output voltage having a rectangular waveform as shown in Figure 5(a) which is fed to a differentiator 12 which produces an output as shown in Figure 5(b) which consists of positive pulses reoccurring 100 times a second. An output voltage in antiphase to that shown in Figure 5(a) is also produced.

In order to excite the transmitting transducer, the output pulses from the differentiator 12 are applied to a transducer driver circuit 13 which for each applied pulse produces a large negative-going pulse of about 300 volts magnitude as shown in Figure 5(c) which when applied to the transmitting transducer 14 causes it to oscillate at its natural frequency and project a beam of ultrasonic waves through the article 15 being tested. The projected ultrasonic waves, as shown in Figure 5(d), decay exponentially, the start coinciding with the positive rise of the initiator output voltage. The high-frequency ultrasonic waves are of course shown for clarity with a far greater wavelength than that true to scale both in Figures 5(d) and the succeeding Figures 5(d) to 5(j).

Two typical waveforms of the signal picked up by the receiver transducer 16 are shown in Figure 5(e), the first one being a typical waveform of the received signal in the absence of a flaw in the path of the ultrasonic waves and the second being a typical waveform of the received signal which has been distorted by an intervening flaw. In practice of course, when 100 ultrasonic pulses are being transmitted each second a change in the waveform of the received signals as great as that between the two pulses shown in Figure 5(e) would take place steadily through a sequence of many pulses.

The received signal in either case is of course delayed by a time $t1$ taken by the ultrasonic waves to pass from the transmitting transducer 14 to the receiving transducer 16. Reflections occur at the various interfaces of the article and these give the distortion shown which is generally a maximum in the second and third received full waves. Continued reflections cause the signal to reappear after it has apparently died away. Some distortion is also caused if the transmitting and receiving transducers have slightly different resonant frequencies.

In any case, however, whether a flaw is being scanned or not, the leading received half wave is unaffected by any of the reflections. The leading half wave of the second received pulse shown in Figure 5(e) is reduced in amplitude due to the effect of a flaw compared with the strength of the leading half wave of the first received pulse shown. The flaw also produces changes in the shape of the rest of the waveform of the received wave due to changes in the transmission time of the various components, but these changes are immaterial as the receiver circuits are arranged to respond only to the amplitude of the first half wave of each received pulse in the following manner.

The electrical signals produced by the receiving transducer 16 are passed to a gate circuit 18 through a high-gain amplifier 17 which has an adjustable gain control which is adjusted to suit the article being tested. The output of the amplifier 17 is also passed through a delay network 19, differentiating type signal amplifier 20, and a gate control circuit 21. The delay network 19 is arranged to impose a delay equal to the duration of half a cycle of the ultrasonic waves. A variable control may be fitted so that this time delay can be accurately set and modified if the frequency of the ultrasonic waves is changed. The resulting output of the delay network 19 is shown in Figure 5(f) and is a delayed and attenuated form of its input.

The signal amplifier 20 is arranged to amplify the delayed signals so that it produces an output having a large-stepped waveform with a steep leading edge as shown in Figure 5(g). The waveform 5(g) is an integration of 5(f), being produced by the amplifier 20 arranged to produce amplitude limitation of the input peaks.

The gate control circuit 21 which is or operates as a bi-stable trigger circuit is fed with the positive-going pulses from the differentiator 12 and with the positive-going pulses from the amplifier 20. The control circuit 21 is arranged to be set in one state after receiving a pulse from the differentiator 12 and to be reset into a second state after receiving a pulse from the amplifier 20. As a result an output is obtained having a waveform as shown in Figure 5(h) which is at a more positive potential level from the beginning of each pulse repetition period until the end of the first half cycle of the received signal.

This output is applied as a control signal to the gate circuit 18 to open this gate to permit the ouput of the amplifier 17 applied to it to pass through the gate circuit when the control signal is at its more positive potential level. The resulting output of the gate circuit 18 is then the first half cycles only of the amplified receiving transducer output. This output waveform is shown in Figure 5(i). Although the gate circuit 18 is opened at the beginning of each repetition cycle some time elapses before the signal from the amplifier 17 arrives. This is of no importance as the time between excitations is long enough for the previous received signal to have died away completely or to an insignificant level.

As previously described, it is the amplitude of the first half wave that is required to be measured and recorded and in practice the delay time of the delay network 19 is adjusted to be somewhat less than half a cycle of the ultrasonic waves so that the first half wave of the amplified received output applied to the gate circuit 18 from the amplifier 17 is gated after it has reached its maximum amplitude but just before it passes through zero in the negative-going direction. This effect is shown in Figures 5(e) to 5(i) and is done as a precaution in case there are any reflections which might begin to give an odd shaped waveform at this instant. The gated output of the gate circuit 18 is fed to a monitor oscilloscope 22 so that the waveform of the output can be observed and the effect of adjusting the delay network 19 and amplifier 20 can be seen. The time base circuits of the oscilloscope 22 are arranged to be triggered by the output of the differentiator 12 preferably through an adjustable delay device 26 so that the gated pulses can be positioned centrally on the screen and any portion of the output of the amplifier 17 viewed if the oscilloscope is connected to the amplifier output.

Although the first received half wave should be distortionless, there may in some cases be distortion present in the form of an additional smaller pulse leading the first main half wave by approximately one quarter of a cycle. The initial wave then consists of the first half wave with a step in the leading edge of amplitude equal to about one tenth of that of the first half wave. This can give trouble of the gain of the amplifier 20 is large so that it is possible to gate the true first half wave while it is still rising and so prevent measurement of its amplitude.

In the arrangement described this distortion can be detected by viewing the oscilloscope 22 and the effect eliminated preferably by adjusting the gain of the amplifier 20 so that the step in the initial rise of the first half wave is too small to operate the gate control circuit 21 and so close the gate circuit 18. Alternatively, the signal from the amplifier 17 which is used to operate the gate control circuit 21 may be derived from the negative-going second half of the leading wave so that it is not necessary to have the delay network 19 and trouble due to the distortion of the first half wave is eliminated. A suitable circuit to effect this will be described hereinafter in connection with Figure 7.

The output from the gate circuit 18 as shown in Figure 5(i) consists of a series of pulse signals and a continuous recorded output is required to be produced which has an amplitude in accordance with the amplitude of the pulse signals. This is done by feeding the output from the gate circuit 18 to a pulse lengthener circuit 23. Each output pulse from the gate circuit 18 is of very low energy content and the function of the pulse lengthener circuit is to produce an output of higher energy content by lengthening each pulse applied from the gate circuit 18.

A suitable pulse lengthener circuit arrangement consists of a storage capacitor which is arranged to be charged by each pulse supplied from the gate circuit 18. The capacitor circuit is arranged to have a long time constant so that the charge is maintained. Consequently, the storage capacitor is arranged to be at least partly discharged before or at the end of each pulse repetition cycle so that the capacitor is free to store the charge due to the next pulse. This may be done by applying a positive-going pulse (conveniently derived from the initiator 11 during the time between the pulses shown in Figure 5(b) to a valve circuit connected across the storage capacitor to make this valve, which is normally cut-off, temporarily conducting so that it discharges the storage capacitor.

The resulting output waveform of the pulse lengthener is in the form shown in Figure 5(j) when the positive-going pulses are derived from the initiator.

The output from the circuit 23 is fed to a recorder driver 24 which is arranged to peak rectify this output and produce a D.C. voltage proportional to the pulse amplitude as shown in Figure 5(k). The recorder driver 24 controls a recording table 25 which consists essentially of a pen recorder which writes in the Y direction on a flat sheet of paper a series of traces across the sheet arranged in line one beneath another in the form shown in Figures 3(a) to 3(e). Each trace is the recorded output during one complete longitudinal scan of the article under test and the movement of the recording pen of the recording table 25 in the X direction along the sheet is arranged to be controlled by the scanning mechansim through the recording driver 24.

By providing two or more complete ultrasonic scanning channels a corresponding increase in speed of testing may be achieved. It is generally advantagous to drive all the sets of electro-mechanical transducers along by a common mounting so that the article under test is scanned along a number of collateral tracks simultaneously. If two complete channels are provided they may conveniently be driven by a single initiator circuit such as the initiator 11, one channel being driven by the initiator output as shown in Figure 5(a) while the other channel is driven by the inverse output so that the two channels produce ultrasonic scanning pulses in an interlaced sequence.

A gate circuit 18 and pulse lengthener circuit 23 which produces a high energy content output is shown in detail in Figure 6. The gate circuit 18 consists essentially of a resistor R1, to which the control voltage from the gate circuit 21 is applied through a terminal $t2$, and a diode valve V1 to which the signal output from the signal amplifier 17 is applied through a terminal $t1$. The signal output is applied through a cathode follower circuit (not shown) whose output is at earth potential when no signal is present. Before the arrival of a signal from the amplifier 17 there is a large positive-going voltage pulse as shown in Figure 5(h) applied from the gate control circuit 21 to the resistor R1. This voltage pulse attempts to raise the potential on the anode of the valve V1 to a level well in excess of the maximum positive signal level which may be applied to the terminal $t1$. The potential on the anode of the valve V1 cannot be raised before the arrival of a signal on the terminal $t1$ as the cathode of the valve V1 is retained at earth potential as previously described.

When however a signal as shown in Figure 5(e) is received by the amplifier 17 and passed to the terminal $t1$ the potential on the anode is allowed to rise and follow the signal potential until the positive-going potential pulse applied to the terminal $t2$ from the gate control circuit is terminated. This has been arranged, as previously described, to occur after the first positive-going signal pulse has passed so that thereafter the anode of the valve V1 can follow only the negative-going signals from the terminal $t1$. These negative-going signals are removed by the circuit comprising rectifiers W1 and W2 (type CV448) so that the signal passed to the pulse lengthener 23 consists of only the first received pulse as shown in Figure 5 (i). A small capacitor may be provided if necessary in parallel with the resistor R1, to increase the gating speed to ensure that unwanted signals immediately following the first pulse are not passed on.

The pulse lengthener circuit consists essentially of a storage capacitor C2 which is arranged to be charged through a cathode follower valve V2 by each pulse received from the gate circuit 18. The capacitor C2 charges rapidly due to the low output impedance of the cathode follower circuit. A triode valve V4 in series with a resistor R2 is connected across the capacitor C2, and the voltage output of the initiator circuit in the inverse form to that shown in Figure 5(a) is applied to the grid of the valve through a terminal $t3$.

As a result during the first half of each $1/100$ second interpulse period the valve V4 is cut off and the capacitor circuit having a very long time constant maintains the charge on the capacitor C2 as shown in Figure 5(j).

During the second half of each period, however, the valve V4 is rendered conducting and, instead of the capacitor C2 being discharged immediately in the absence of a resistor R2 as shown in Figure 5(j), the capacitor is discharged at a rate dependent upon the time constant of the capacitor C2 and the resistor R2. This is arranged to be such that the charge is reduced by about 10% during a second half period and so the mean potential level and the output of the pulse lengthener circuit is increased.

The output which is produced on terminal t4 takes up the level of the next voltage applied to the capacitor C2. In exceptional cases when a voltage pulse is more than about 10% less than its predecessor the output level will continue to fall during the next one or two second half inter-pulse periods in accordance with the time constant of the storage capacitor circuit. The output on the terminal t4 is suitably smoothed before being passed to the recording circuits.

The previously mentioned alternative circuit arrangement in place of the delay network 19 and amplifier 20 and which operates the gate control 21 when the first negative-going signal is received from the amplifier 17 will now be described with reference to Figure 7. The output from the amplifier 17 is applied from a terminal t11 to a capacitor C11 which charges up to the peak of the first positive-going pulse. No positive-going input voltage, however, is as a result applied to a valve V11 due to the grid being clamped at earth potential by the action of a diode valve V12. Even if a small positive-going signal was able to reach the grid of the valve V11 this is arranged not to produce any output from the valve by making the valve fully conducting in its quiescent condition.

Directly the first positive-going peak has passed and the signal potential starts to fall the grid of the valve V11 is driven negative and a positive-going step voltage is obtained at the anode, the magnitude of which is determined by resistors R12, R13 and R14. A second diode valve V13 passes this positive-going voltage step to a cathode follower valve V14. The valve V11 remains cut off until the capacitor C11 has discharged through the resistor R11.

The resulting output on the anode of the valve V11 is a positive-going step voltage having a ripple due to the negative-going peaks in the input to the capacitor C11 which are larger than any preceding peak, and cause a temporary rise in the potential applied to the grid of the valve V11 and hence the valve to conduct temporarily. This ripple is arranged to be removed by a capacitor C12.

The circuit shown in Figure 7 produces a large positive-going step voltage for closing the gate circuit 18 just after the occurrence of the first positive-going peak in each received pulse. If the capacitor C11 were not present or were a very high value the step voltage would be delayed and would occur later during the second half of the leading half-wave.

We claim:

1. An ultrasonic testing apparatus for detecting flaws in solid articles and comprising an electrical transmitting circuit for producing a sequence of electrical pulses, a multivibrator for triggering said electrical transmitting circuit, an electro-mechanical transmitting transducer to which the electrical pulses are applied to provide a beam of pulses of ultrasonic waves from the transducer, an electro-mechanical receiving transducer positioned in the path of the beam, said solid articles positioned intermediate the transmitting transducer and the receiving transducer, said ultrasonic waves transmitted through said solid articles, said receiving transducer responsive to the ultrasonic waves transmitted through the solid articles, electrical receiving circuit for deriving a sequence of electrical pulse signals in accordance with the sequence of pulses of ultrasonic waves impinging on the receiving transducer, a delay circuit which imposes a delay of between a quarter and half a wavelength of an ultrasonic wave and to which the sequence of derived electrical signals is applied, an amplifier circuit to which the output of the delay circuit is applied whereby a large amplitude signal is produced having a steep leading edge between a quarter and half a wavelength after the beginning of each derived pulse signal, a gate control circuit to which the said large amplitude signal is applied to put the circuit in an off state, a gate circuit which is open to pass the leading part of each received electrical pulse signal and which closes shortly after the leading quarter ultrasonic wave in each pulse has passed therethrough, and an output circuit to which the derived sequence of pulse signals passed by the gate circuit are applied and which produces an output signal in accordance with the strength of the leading half wave of each derived electrical pulse signal.

2. An ultrasonic testing apparatus according to claim 1 and in which the said output circuit comprises a storage capacitor to which the output of the gate circuit is applied to charge the capacitor, and means for at least partially discharging the capacitor before the arrival of each output pulse from the gate circuit, said means comprising a positive-going pulse, derived from said multivibrator and applied to an electron tube input circuit connected across said capacitor, said tube being normally cut-off but conducting when said positive-going pulse is applied to discharge said capacitor.

3. An ultrasonic testing apparatus for detecting flaws in solid articles and comprising an electrical transmitting circuit for producing a sequence of electrical pulses, a multivibrator for triggering said electrical transmitting circuit, an electro-mechanical transmitting transducer to which the electrical pulses are applied to provide a beam of pulses of ultrasonic waves from the transducer, an electro-mechanical receiving transducer positioned in the path of the beam, said solid articles positioned intermediate the transmitting transducer and the receiving transducer, said ultrasonic waves transmitted through said solid articles, said receiving transducer responsive to the ultrasonic waves transmitted through the solid articles, electrical receiving circuit for deriving a sequence of electrical pulse signals in accordance with the sequence of ultrasonic waves impinging on the receiving transducer, a phase-reversing amplifier circuit to which the sequence of derived electrical pulse signals is applied and which produces an amplified positive-going signal having a leading edge which occurs between a quarter and a whole wavelength after the beginning of each derived pulse signal, a gate control circuit to which the said amplifier positive-going signal is applied to put the circuit in an off state, a gate circuit which is opened to pass the leading part of each received electrical pulse signal and which closes shortly after the leading quarter ultrasonic wave in each pulse passed therethrough, and an output circuit to which the derived sequence of pulse signals passed by the gate circuit are applied and which produces an output signal in accordance with the strength of the leading half wave of each derived electrical pulse signal.

4. An ultrasonic testing apparatus according to claim 3 and in which the said output circuit comprises a storage capicitor to which the output of the gate circuit is applied to charge the capacitor and means for at least partially discharging the capacitor before the arrival of each output pulse from the gate circuit, said means comprising a positive-going pulse derived from said multivibrator and applied to an electron tube input circuit connected across said capacitor, said tube being normally cut-off but conducting when said positive-going pulse is applied to discharge said capacitor.

5. An ultrasonic testing apparatus for detecting flaws in solid articles comprising an electrical transmitting circuit for producing a sequence of electrical pulses, a transmitting transducer to which the electrical pulses are applied to provide a beam of pulses of ultrasonic waves from the transmitting transducer, a receiving transducer positioned in the path of said beam, said solid articles positioned intermediate the transmitting transducer and the receiving transducer, said ultrasonic waves transmitted through said articles, said receiving transducer responsive to the ultrasonic waves transmitted through the solid articles, a gate circuit, a receiving circuit connecting said receiver transducer to said gate circuit for transmitting a received signal therethrough, a bistable trigger control circuit connected between said transmitting circuit and said gate circuit, the bistable trigger control circuit generating a pulse to open said gate circuit in response to an electrical pulse from the transmitting circuit, delay means connected to the receiving circuit, and amplifier means connected between the delay means and bistable trigger control circuit whereby the bistable trigger control circuit closes said gate circuit shortly after the leading quarter wave of said received signal has passed therethrough, and an output circuit connected to said gate circuit which produces an output signal proportional to the strength of the leading half wave of said received signal.

References Cited in the file of this patent

UNITED STATES PATENTS

| | | |
|---|---|---|
| 2,280,226 | Firestone | Apr. 21, 1942 |
| 2,461,543 | Gunn | Feb. 15, 1949 |